J. Hyde,
Nut Wrench.
Nº 13,617.          Patented Oct. 2, 1855.
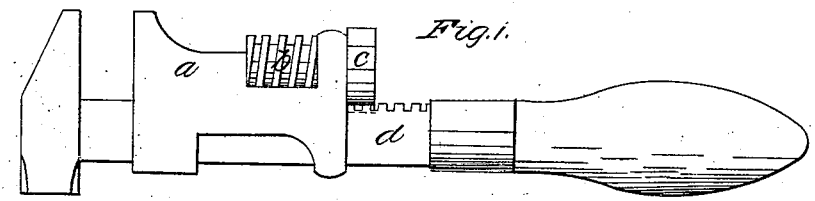
 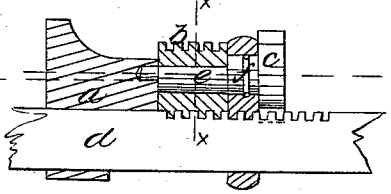 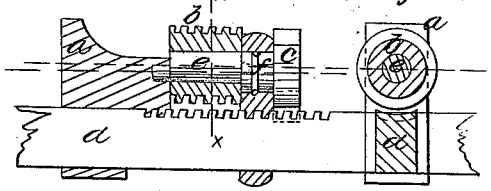

UNITED STATES PATENT OFFICE.

JOSEPH HYDE, OF NEW YORK, N. Y.

SCREW-WRENCH.

Specification of Letters Patent No. 13,617, dated October 2, 1855.

*To all whom it may concern:*

Be it known that I, JOSEPH HYDE, of the city and State of New York, have invented a new and useful Improvement in Screw-Wrenches; and I do hereby declare that the following is a full and fair description thereof, reference being had to the accompanying drawings and to the letters of reference marked thereon.

To enable others skilled in the art to make and use my invention I will proceed to describe its construction and operation.

I make my wrench of any convenient form only in lieu of the screw-cut around or on the corners of the bar I cut a spiral rack in the front side of the bar.

Figure 1, is a side elevation of the entire wrench. Fig. 2 is a section of the moving jaw and screw (e) in contact with the bar d. Fig. 3 is a section of ditto, not in contact with the bar. Fig. 4 is an end section cut through at the line x x with the screw in contact with the bar. Fig. 5 is a section of ditto with the screw not in contact.

The same letters refer to like parts throughout the description.

a, Fig. 1, is the moving jaw fitting close to the bar d and provided with a recess to receive the screw (b).

b is a short screw with a hole through its center, through which goes the eccentric shaft (e). The shaft e is turned from two centers so that by giving the shaft one half a revolution the screw b will be raised out of the rack in the bar.

c, is a thumb-piece for turning the shaft e, and acts also as a stop to prevent the shaft from turning too far.

f, is groove in the largest bearing of the shaft in which fits a pin to hold the shaft into the jaw a. I make the threads of my screw unlike those shown in the drawings, which are square, for the reason that sometimes the square threads strike on their tops and do not mesh together without being turned a little, but by making them V or leveled threads, they can not miss of meshing at whatever point they strike.

What I claim as new and desire to secure by Letters Patent is—

The eccentric shaft e, and thumb piece c, as they are arranged in relation to the screw b, of the movable jaw, so that the screw may be thrown in and out of gear with the bar and the jaw be moved by sliding it on the bar, or through the turning of the screw, as herein set forth.

JOSEPH HYDE.

Witnesses:
 B. COLLINS,
 R. D. O'CONNOR.